United States Patent [19]
Lim

[11] Patent Number: 5,557,329
[45] Date of Patent: Sep. 17, 1996

[54] VIDEO CAMERA HAVING ROTATING MECHANISM FOR ROTATING IMAGE PICKUP WITH RESPECT TO THE CAMERA AND A LENS MOUNT

[75] Inventor: Tae-hyoung Lim, Suwon, Rep. of Korea

[73] Assignee: Samsung Electronics Co., Ltd., Kyungki-Do, Rep. of Korea

[21] Appl. No.: 361,569

[22] Filed: Dec. 22, 1994

[30] Foreign Application Priority Data

Dec. 24, 1993 [KR] Rep. of Korea .................. 1993-29589

[51] Int. Cl.$^6$ ..................................................... H04N 5/225
[52] U.S. Cl. ........................... 348/373; 348/374; 348/583
[58] Field of Search ..................................... 348/373, 374, 348/375, 376, 583, 335; 382/296

[56] References Cited

U.S. PATENT DOCUMENTS

| | | | |
|---|---|---|---|
| 4,655,548 | 4/1987 | Jue | 348/373 |
| 4,734,778 | 3/1988 | Kobayashi | 348/374 |
| 5,218,439 | 6/1993 | Mizaguchi et al. | 348/373 |

*Primary Examiner*—Wendy Garber
*Attorney, Agent, or Firm*—Sughrue, Mion, Zinn, Macpeak & Seas

[57] ABSTRACT

A video camera has a group of lenses forming an optical image from a photographed object, a lens mount for supporting the group of lenses, and an image pickup device installed on the optical axis, for converting the optical image into an electric signal. The video camera further includes an image pickup device rotator for rotating the image pickup device with respect to the lens mount along the optical axis so that the photographed object can be displayed on the image medium in a rotated state by a predetermined angle. Therefore, the operation for displaying the photographed object on the screen of an image medium in a rotated state, can be performed easily, precisely and versatilely without rotating the video camera itself.

9 Claims, 6 Drawing Sheets

VIDEO CAMERA HAVING ROTATING MECHANISM FOR ROTATING IMAGE PICKUP WITH RESPECT TO THE CAMERA AND A LENS MOUNT

BACKGROUND OF THE INVENTION

1. Field of the Invention

The present invention relates to a video camera and, more particularly, to an improved video camera by which the operation of displaying a photographed object on the screen of an image medium in a rotated state can be achieved easily.

2. Description of the Related Art

A video camera forms an optical image of a photographed object on an image pickup device, which is an internally installed solid state image pickup device such as a charge-coupled device, and converts the optical image into an electric signal to then be reproduced on the screen of an image medium such as a television or the like.

An example of such a video camera is schematically illustrated in FIG. 1. Referring to FIG. 1, there is provided a lens mount 3 in one side of a main body 2 of the video camera 1 and a lens group 4 is installed within the lens mount 3. A supporting member 6 is fixed at one end of the lens mount 3, as shown in FIG. 2 which is a cross-sectional view of a portion "A" in FIG. 1. An image pickup device 5 where an optical image of the photographed object formed by the lens group 4 is formed is fixed in the supporting member 6. Therefore, the image pickup device 5 maintains a fixed state with respect to the lens mount 3. The optical image of the photographed object formed on the image pickup device 5 is converted into an electric signal to be reproduced on the screen of an image medium such as a television or the like.

Meanwhile, when a photographer desires to photograph an object with the video camera having the aforementioned configuration, for a characteristic screen construction, the object can be displayed on the screen of the image medium in a rotational state with a predetermined angle. For this purpose, conventionally, in the case of a lightweight portable video camera, the photographer holding the video camera may lean to the side or rotate the video camera itself.

Accordingly, the image pickup device integrally installed in the video camera is maintained in a rotational state with respect to the object so that the photographed object is displayed on a screen in the rotated state by the rotation angle of the image pickup device. Moreover, in the case of a large video camera such as those used at television studios which cannot be rotated manually, the video camera must be rotated by using a complex mechanism having a robot structure.

However, according to the above manual photographing methods, it is difficult to attain a desired predetermined angle and to maintain the same rotation angle for a period of time, and may result in a flickering of the photographed object on the screen. Also, in order to rotate large video cameras, a complex mechanism is necessary, which requires an additional cost and a spacious area. Thus, a versatile photographic operation is hard to achieve.

SUMMARY OF THE INVENTION

To solve the above problems, it is an object of the present invention to provide an improved video camera by which the operation of displaying a photographed object on the screen of an image medium in a state rotated by a predetermined angle can be performed easily, precisely and versatilely at a low cost.

To accomplish the above object, the video camera according to the present invention has a group of lenses forming an optical image from a photographed object, a lens mount for supporting the group of lenses and an image pickup device installed on the optical axis of the group of lenses so as to form the optical image, for converting the optical image into an electric signal. The video camera further comprises an image pickup device rotating means for rotating the image pickup device with respect to the lens mount along the optical axis so that the photographed object can be displayed on an image medium in a rotated state by a predetermined angle.

BRIEF DESCRIPTION OF THE DRAWINGS

The above objects and advantages of the present invention will become more apparent by describing in detail a preferred embodiment thereof with reference to the accompanying drawings, in which.

DETAILED DESCRIPTION OF THE PREFERRED EMBODIMENT

Figure 1:
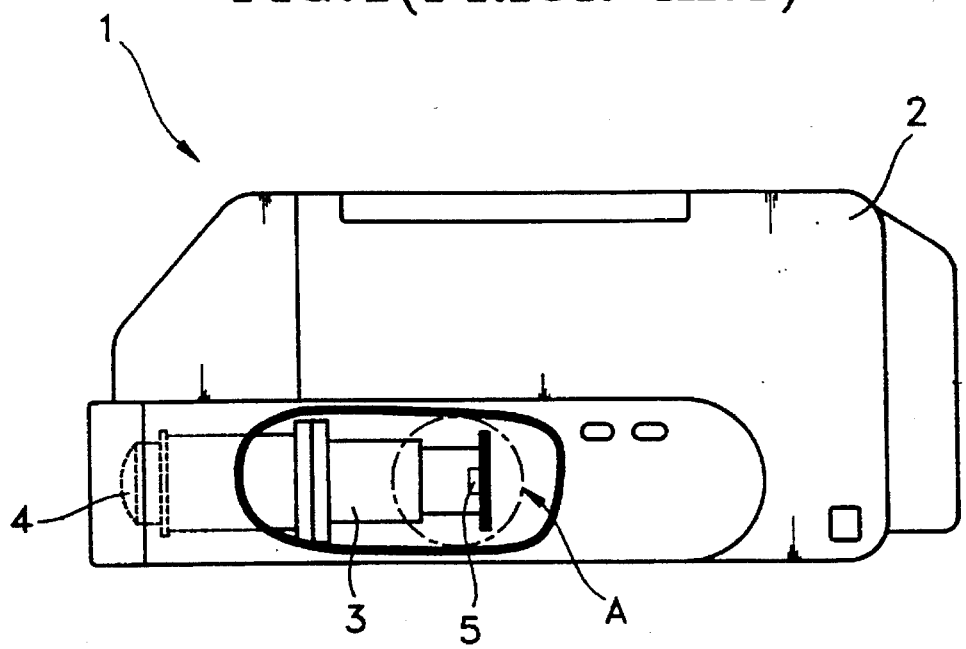
FIG. 1 is a schematic side view showing an example of a conventional video camera.
Figure 2:
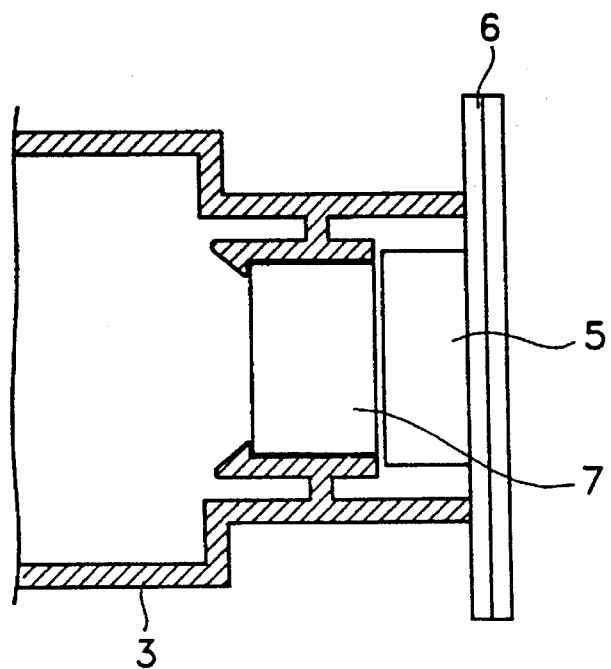
FIG. 2 is an extracted schematic side view of the "A" portion of the video camera shown in FIG. 1.
Figure 3:
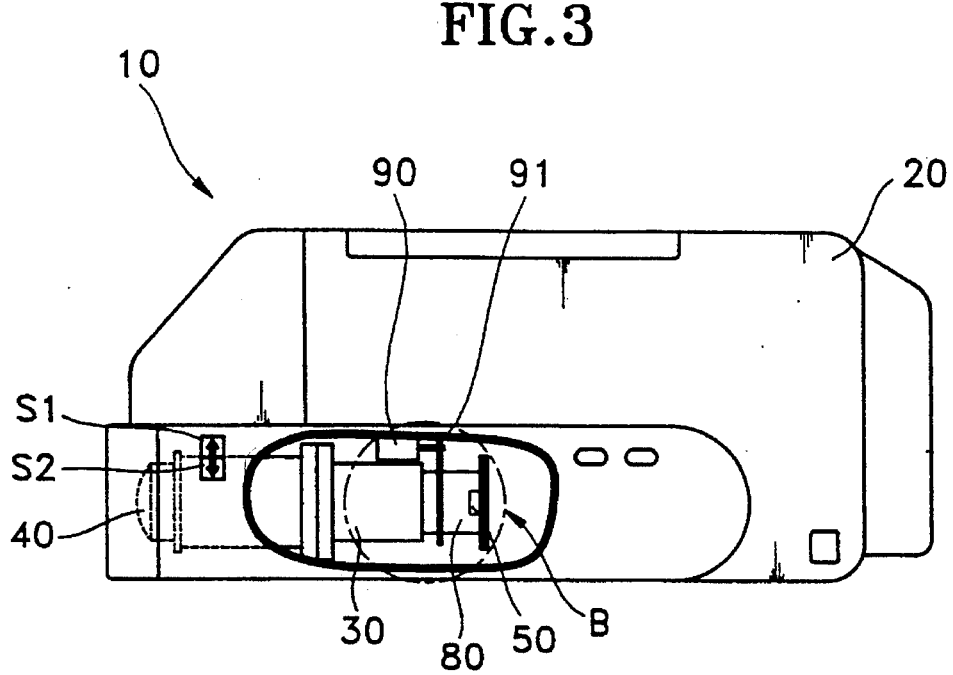
FIG. 3 is a schematic side view showing a video camera according to the present invention.
Figure 4:
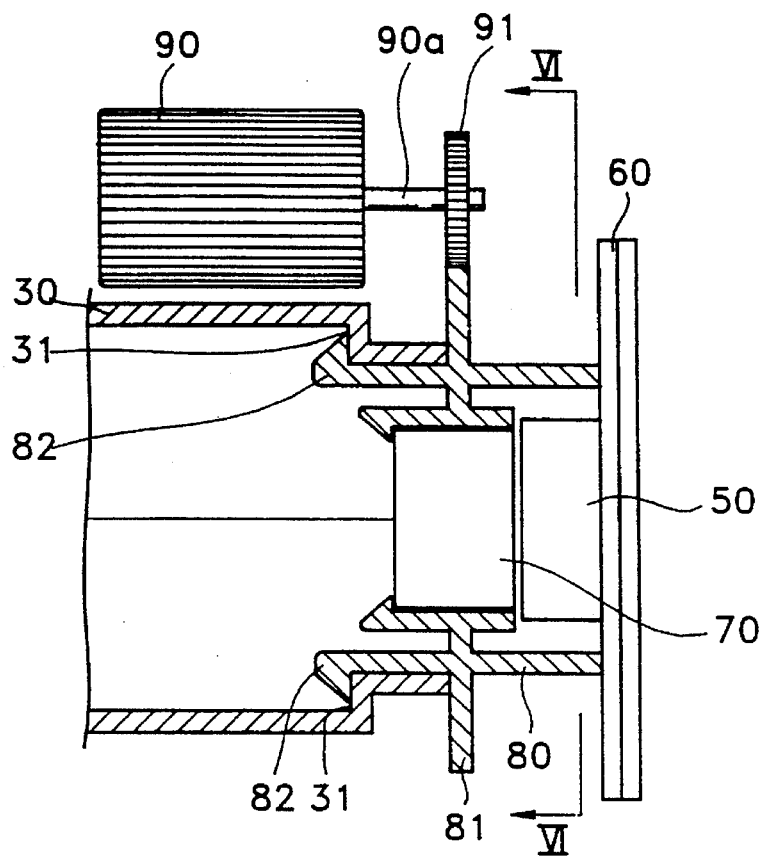
FIG. 4 is an extracted schematic side view of the "B" portion of the video camera shown in FIG. 3.
Figure 5:
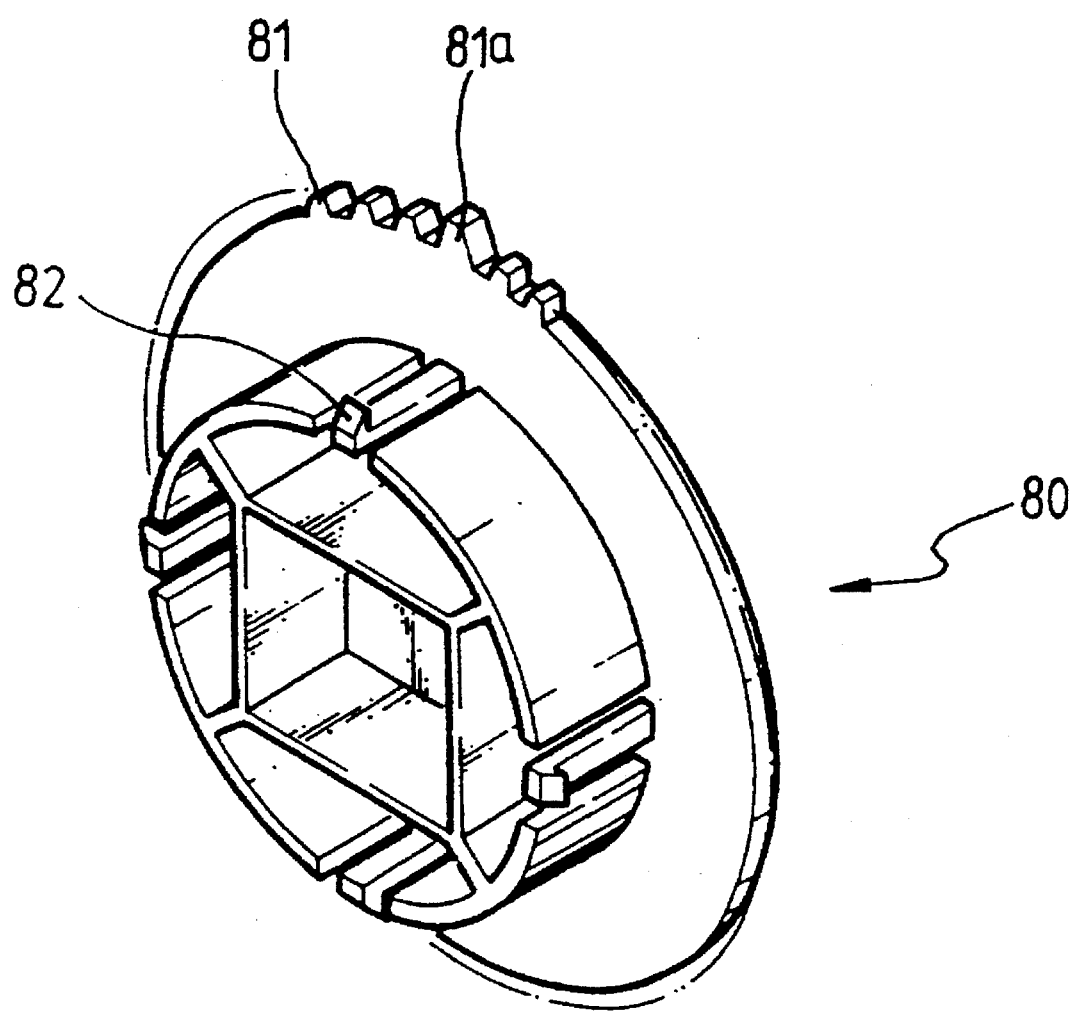
FIG. 5 is a perspective view of a rotating member shown in FIG. 4.

Referring to FIGS. 3 to 5, there is provided a lens mount 30 in one side of a main body 20 of a video camera 10. A group of lenses 40 for forming an optical image from a photographed object is installed within the lens mount 30. An image pickup device 50 is installed along the optical axis of the group of lenses 40 and the optical image is formed on the image pickup device 50. Also, means is provided for rotating the image pickup device 50 on the optical axis with respect to the lens mount 30. The rotating means includes a supporting member 60, a rotating member 80, a motor 90 and a gear 91.

The image pickup device 50 is fixed on one side of the supporting member 60. The rotating member 80 is supported by the lens mount 30 so as to be rotatable along the optical axis with respect to the lens mount 30. The supporting member 60 is fixed on one side of the rotating member 80. A gear portion 81 is formed on the outer circumferential surface of the rotating member 80. Meanwhile, in order to connect the lens mount 30 and rotating member 80 easily, a circumferential flange 31 is formed internally at one end of the lens mount 30 and a plurality of elastic parts 82, which are fitted elastically in the lens mount 30 to be caught on the circumferential flange 31, is formed, so that the rotating member 80 is rotatably supported with respect to the lens mount 30.

The motor 90 is reversible so as to rotate in opposite directions, and the gear 91 is connected to gear shaft 90a. The gear 91 is in meshing engagement with the gear portion 81 of the rotating member 80 and transmits the power from the motor 90 to the rotating member 80.

A stop 81a (e.g., an elongated gear tooth) is provided on the rotating member 80 for restricting the rotational arc of the rotating member 80. However, the stop may be installed on the gear 91 in order to restrict the rotation of the rotating member 80. Reference symbols S1 and S2 represent switches for operating the motor 90, and reference numeral 70 represents a filter.

The operation of the video camera 10 according to the present invention will now be described with reference to FIGS. 6 to 12, together with FIGS. 3 to 5.

Figure 6:
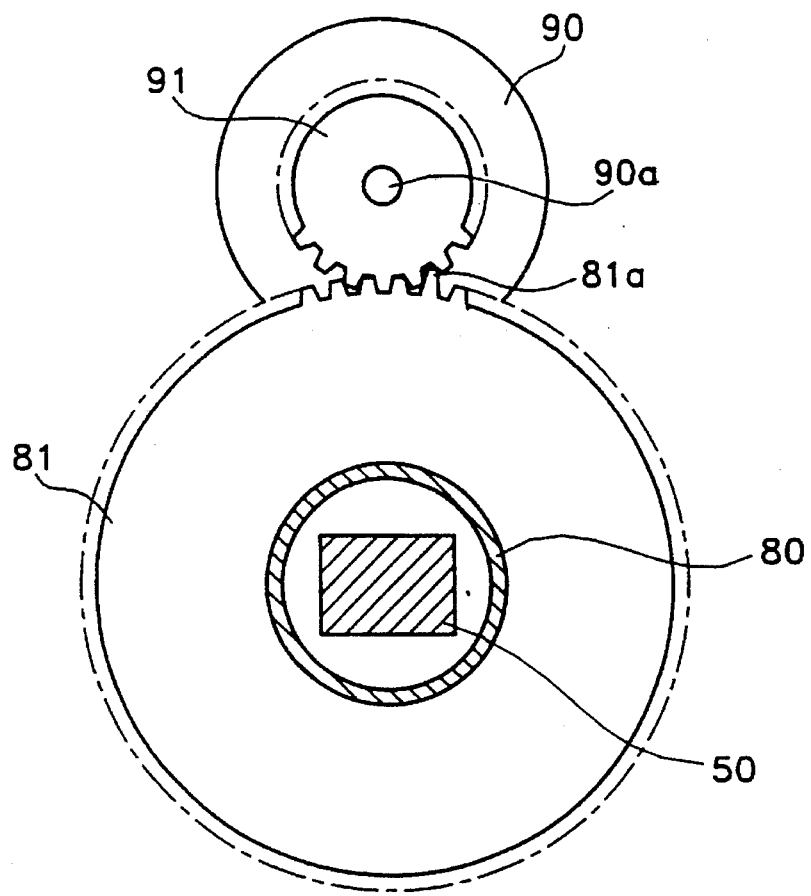
FIG. 6 is a sectional view along a line VI—VI of FIG. 4.
Figure 7:
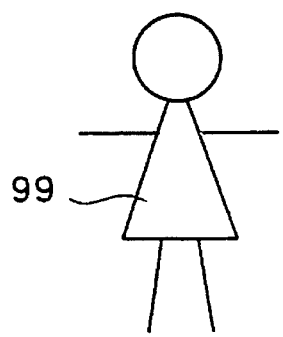
FIG. 7 is a schematic diagram of a photographed object.
Figure 8:
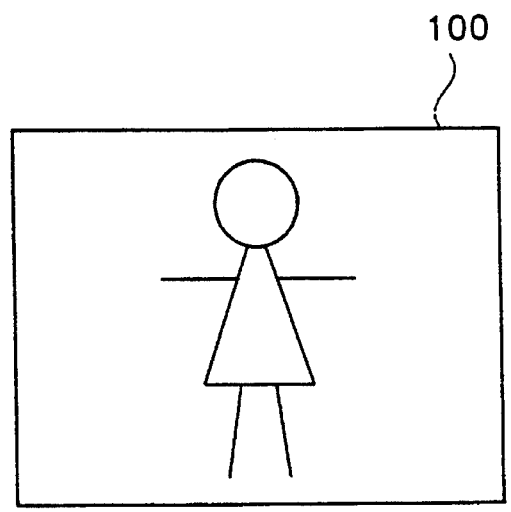
FIG. 8 shows a screen state when the photographed object is taken with a video camera having an image pickup device shown in FIG. 6.

FIG. 6 is a sectional diagram along a line VI—VI shown in FIG. 4 and shows the state where the image pickup device 50 fixed on the rotating member 80 is not rotated. In this manner, if the upright object 99 is photographed with the video camera 10 being in the non-rotated state, as shown in FIG. 7, the object is displayed on the screen 100 of an image medium in the upright state, as shown in FIG. 8.

In such a state, if the motor 90 is forwardly rotated by pressing the switch S1, the gear 91 connected with the motor shaft 90a rotates counterclockwise in FIG. 6. Accordingly, the rotating member 80 meshed with the gear 91 and the supporting member 60 connected with the rotating member 80 rotate clockwise with respect to the lens mount 30 in FIG. 6. Therefore, the image pickup device 50 fixed in one side of the supporting member 60 is also rotated.

Figure 9:
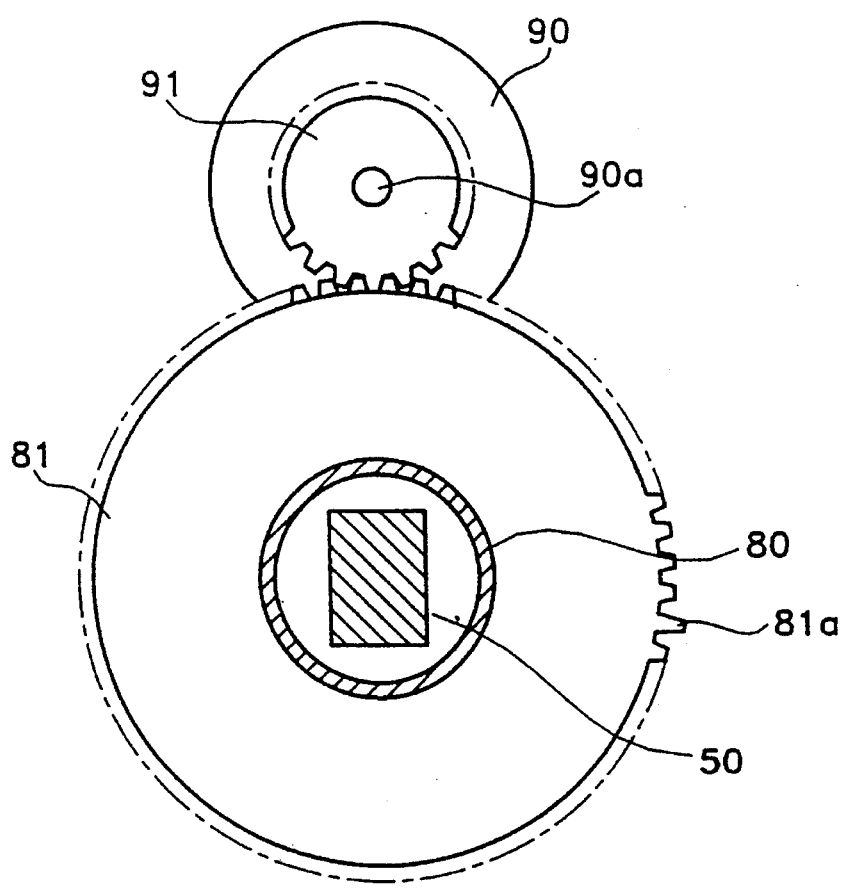
FIG. 9 schematically shows the state obtained by rotating the image pickup device by a predetermined angle from the state shown in FIG. 6.
Figure 10:
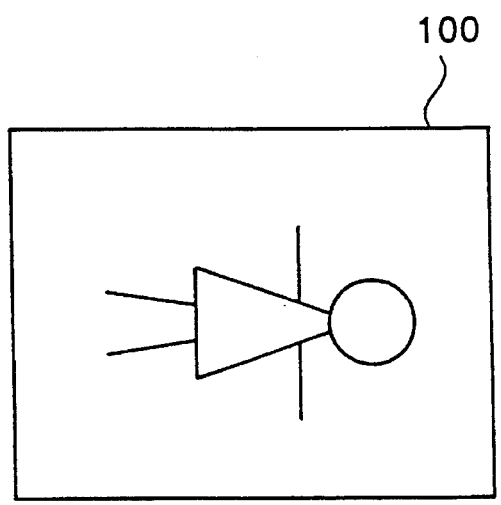
FIG. 10 shows a screen state when the photographed object is obtained with a video camera having an image pickup device oriented as shown in FIG. 9.

While the image pickup device 50 rotates, if the motor 90 is stopped by switching off the switch S1, the image pickup device 50 also stops in the state where it is rotated by a predetermined angle (90° in the drawing), as shown in FIG. 9. In this manner, if the object 99 is photographed with the video camera being in the state where the image pickup device 50 is rotated by a predetermined angle, as shown in FIG. 9, the object 99 is displayed on the screen 100 of the image medium in the rotated state by the rotation angle of the image pickup device 50, as shown in FIG. 10.

Figure 11:
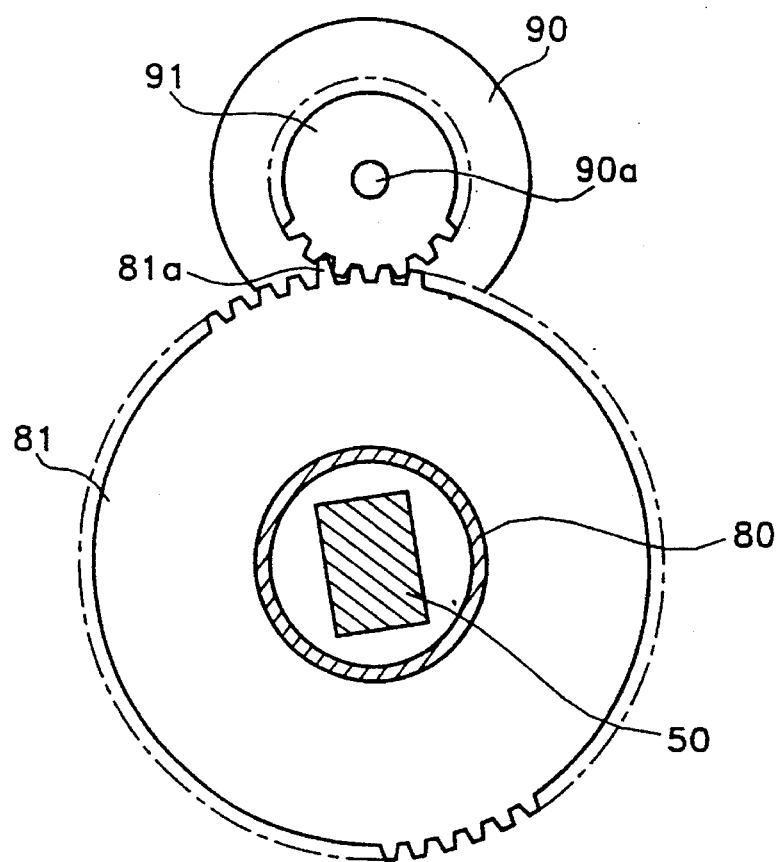
FIG. 11 schematically shows the state in which the image pickup device cannot be further rotated.
Figure 12:
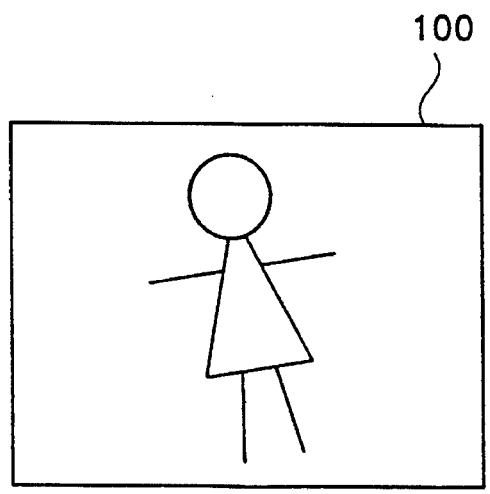
FIG. 12 shows a screen state when the photographed object is taken with a video camera having an image pickup device shown in FIG. 11.

In such a state, if the switch S1 is pressed, the image pickup device 50 rotates again clockwise. Meanwhile, while the image pickup device 50 rotates, if the stop 81a formed on the gear portion 81 of the rotating member 80 is caught in the gear 91, the rotating member 80 does not rotate any further, as shown in FIG. 11. Thus, rotation of the image pickup device 50 beyond 360° (in one direction) can be prevented. The object photographed with the video camera being in such a state is displayed on the screen 100 of the image medium in a slightly slanted state, as shown in FIG. 12.

Meanwhile, in the state where the image pickup device 50 is rotated by a predetermined angle with respect to the lens mount 30, as shown in FIG. 9 or 11, if the motor 90 is reversely rotated, the image pickup device 50 interlocked with the rotating motor 90 rotates counterclockwise, thereby returning to the original state shown in FIG. 6. If the upright object 99 is photographed in such a state, the object 99 is displayed in an upright state, as shown in FIG. 8.

In this embodiment, the rotational power from the motor 90 is transmitted to the rotating member 80 via a gear portion 91. However, a general power transmission system such as a link system can be used instead of the gear system. Also, although the rotating member 80 and the supporting member 60 are provided separately in this embodiment, and then are fixedly connected to each other, they may be formed integrally.

Also, the video camera according to this embodiment includes a motor for rotating the image pickup device. However, according to the present invention, a video camera is contemplated wherein the image pickup device is rotated with respect to the lens mount using a driving means other than a motor. For example, a part of the rim of the rotating member may be made to be projected toward the body of the video camera externally, and then the projecting portion of the rotating member is rotated manually, thereby rotating the fixed image pickup device with respect to the rotating member.

As described above, the video camera according to the present invention includes an image pickup device rotatably installed with respect to a lens mount and means for rotating the image pickup device. Therefore, the operation for displaying the photographed object on a screen of an image medium in a rotated state by a predetermined angle can be performed easily, precisely and versatilely without rotating the video camera itself.

It is contemplated that numerous modifications may be made to the video camera of the present invention without departing from the spirit and scope of the invention as defined in the following claims.

What is claimed is:

1. A video camera comprising: a group of lenses having an optical axis and forming an optical image from a photographed object, a lens mount for supporting said group of lenses, an image pickup device installed on the optical axis of said group of lenses so as to form said optical image and for converting said optical image into an electric signal, and an image pickup device rotating means for rotating said image pickup device with respect to said lens mount by up to 360° along said optical axis so that said photographed object is displayed on an image medium in a rotated state by a predetermined angle.

2. The video camera as claimed in claim 1, wherein said image pickup device rotating means includes a reversible rotatable motor and a supporting member with said image pickup device fixed on one side thereof and rotatably installed on said optical axis with respect to said lens mount by means of said motor.

3. The video camera as claimed in claim 2, wherein said image pickup device rotating means further includes a gear connected to a shaft of said motor, and a rotating member mounted on an end of said lens mount so as to be rotatable with respect to said lens mount, said rotating member having a gear portion on an outer circumferential surface thereof and which is in meshing engagement with said gear, said supporting member being fixed on one side of said rotating member, wherein a rotational power of said motor is transmitted to said supporting member through said gear and said rotating member.

4. The video camera as claimed in claim 3, wherein a stop for restricting the rotational extent of said rotating member is provided on one of said gear portion of said rotating member and said gear.

5. The video camera as claimed in claim 3, wherein a circumferential flange is formed internally at one internal end of said lens mount, and wherein said rotating member includes a plurality of parts elastically fitted to said lens mount for being caught on said circumferential flange, so that said rotating member is rotatably mounted to said lens mount.

6. A video camera comprising:

a group of lenses having an optical axis and forming an optical image from a photographed object;

a lens mount for supporting said group of lenses;

an image pickup device installed on said optical axis of said group of lenses so as to form said optical image and for converting said optical image into an electric signal;

a supporting member for fixedly supporting said image pickup device;

a rotating member rotatably mounted on an end of said lens mount, said supporting member being fixed on one side of said rotating member, so that said image pickup device is rotatably mounted on said optical axis with respect to said lens mount for rotation of up to 360°; and a reversible rotatable motor for rotating said rotating member along with said supporting member so as to rotate said image pickup device with respect to said lens mount along said optical axis so that said photographed object is displayed on an image medium in a rotated state by a predetermined angle.

7. The video camera as claimed in claim 6, further comprising a gear connected to a shaft of said motor, said rotating member having a gear portion on an outer circumferential surface thereof and which is in meshing engagement with said gear.

8. A video camera comprising: a group of lenses having an optical axis and forming an optical image from a photographed object, a lens mount for supporting said group of lenses, an image pickup device installed on the optical axis of said group of lenses so as to form said optical image and for converting said optical image into an electric signal, and an image pickup device rotating means for rotating said image pickup device with respect to said lens mount along said optical axis so that said photographed object is displayed on an image medium in a rotated state by a predetermined angle, wherein said image pickup device rotating means includes a reversible rotatable motor and a supporting member with said image pickup device fixed on one side thereof and rotatably installed on said optical axis with respect to said lens mount by means of said motor, and further wherein said image pickup device rotating means includes a gear connected to a shaft of said motor, and a rotating member mounted on an end of said lens mount so as to be rotatable with respect to said lens mount, said rotating member having a gear portion on an outer circumferential surface thereof and which is in meshing engagement with said gear, said supporting member being fixed on one side of said rotating member, wherein a rotational power of said motor is transmitted to said supporting member through said gear and said rotating member.

9. A video camera comprising:

a group of lenses having an optical axis and forming an optical image from a photographed object;

a lens mount for supporting said group of lenses;

an image pickup device installed on said optical axis of said group of lenses so as to form said optical image and for converting said optical image into an electric signal;

a supporting member for fixedly supporting said image pickup device;

a rotating member rotatably mounted on an end of said lens mount, said supporting member being fixed on one side of said rotating member, so that said image pickup device is rotatably mounted on said optical axis with respect to said lens mount; and a reversible rotatable motor for rotating said rotating member along with said supporting member so as to rotate said image pickup device with respect to said lens mount along said optical axis so that said photographed object is displayed on an image medium in a rotated state by a predetermined angle, further comprising a gear connected to a shaft of said motor, said rotating member having a gear portion on an outer circumferential surface thereof and which is in meshing engagement with said gear.

\* \* \* \* \*